United States Patent
Baechtle et al.

[19]

[11] Patent Number: 5,875,010
[45] Date of Patent: Feb. 23, 1999

[54] DISPLAY PANEL HAVING INDIVIDUAL DISPLAY DEVICES BONDED TO LIGHT TRANSMITTING PLATES WHICH HAVE A COMBINED AREA GREATER THAN OF THE DEVICES

[75] Inventors: Jeffrey C. Baechtle; Michael A. Gaynes, both of Vestal; Mark V. Pierson, Binghampton; Anne M. Quinn, deceased, late of Kirkwood, by Ronald D. Quinn, executor; David B. Stone, Owego, all of N.Y.

[73] Assignee: International Business Machines Corporation, Armonk, N.Y.

[21] Appl. No.: 803,097

[22] Filed: Feb. 20, 1997

[51] Int. Cl.[6] ..................................................... G02F 1/133
[52] U.S. Cl. ............................................. 349/73; 348/158
[58] Field of Search ........................................ 349/73, 153

[56] References Cited

U.S. PATENT DOCUMENTS

| | | | |
|---|---|---|---|
| 4,156,833 | 5/1979 | Wey et al. ............................... | 340/719 |
| 4,408,836 | 10/1983 | Kikuno .................................... | 350/334 |
| 4,824,215 | 4/1989 | Joseph et al. ............................ | 349/73 |
| 4,980,774 | 12/1990 | Brody ..................................... | 358/241 |
| 5,067,021 | 11/1991 | Brody ..................................... | 368/241 |
| 5,164,853 | 11/1992 | Shimazaki ................................ | 359/82 |
| 5,206,749 | 4/1993 | Zavracky et al. ........................ | 359/59 |
| 5,256,562 | 10/1993 | Vu et al. .................................. | 437/86 |
| 5,258,325 | 11/1993 | Spitzer et al. ............................ | 437/86 |
| 5,300,788 | 4/1994 | Fan et al. ................................. | 257/13 |
| 5,377,031 | 12/1994 | Vu et al. .................................. | 359/59 |

FOREIGN PATENT DOCUMENTS 1-302222  12/1989  Japan .

OTHER PUBLICATIONS

Gu, G. et al., "Vacuum–deposited, nonpolymeric, flexible organic light–emitting devices", Optics Letters, vol. 22, No. 3, Feb. 1, 1997, pp. 172–174.

Burrows, P.E. et al., "Color–tunable organic light–emitting devices", Appl. Phys. Letters, vol. 69, No. 20, Nov. 11, 1996, pp. 2959–2961.

Bulovic, V. et al., "Transparent light–emitting devices", Nature, vol. 380, Mar. 7, 1996, p. 29.

*Primary Examiner*—William L. Sikes
*Assistant Examiner*—Toan Ton
*Attorney, Agent, or Firm*—John R. Pivinichny

[57] ABSTRACT

A display panel and method of making same in which the panel comprises a plurality of display devices mounted between light-transmitting plates. The structure includes clear and opaque bonding materials positioned to retain alignment and provide acceptable brightness, contrast, and resolution while holding the display devices in contact with the light-transmitting plates.

28 Claims, 4 Drawing Sheets

DISPLAY PANEL HAVING INDIVIDUAL DISPLAY DEVICES BONDED TO LIGHT TRANSMITTING PLATES WHICH HAVE A COMBINED AREA GREATER THAN OF THE DEVICES

TECHNICAL FIELD

The invention relates to display panels and particularly to display panels made up by combining a plurality of individual display devices into a display panel. Also the present invention relates to the method of bonding individual display devices together to form such a panel.

BACKGROUND OF THE INVENTION

The size of an individual display device such as a liquid crystal display (LCD) element is necessarily limited by acceptable manufacturing yields using currently known techniques. It is therefore advantageous to be able to combine several display devices together to produce either a larger display or to mount individual display devices in various positions on a larger display panel. For example in the computer, television and entertainment industries, large area displays of a size much larger than single display device sizes are desired for viewing by groups of people or single individuals. In such applications close placement and alignment of display devices to each other are critical parameters in order to make the edges of the display devices inconspicuous; that is, to insure no breaks are visible as information is viewed across the boundaries from display device to display device. Automotive and aircraft dashboard panels may require information such as speed, temperature, and fuel level to be displayed in various positions, sometimes with large gaps between these positions, on a large overall display panel.

One method of forming a display panel is to clamp individual display elements between two glass plates using screws or other tighteners and brackets of various design about the edges of the glass plates. Individual display elements can then be viewed through one of the glass plates and the display can be illuminated if necessary by placing a light source behind the second glass plate. Such a method is set forth for example in U.S. Pat. No. 4,156,833, said patent incorporated herein by reference. Both the illuminating radiation (hereinafter referred to as light) as well as the display device image must of necessity pass through one or more of the glass plates. Optical properties of the glass plates (such as the transmission/absorption spectrum, and reflectance properties of both surfaces) are critical design parameters which affect display panel performance, possibly causing reductions in brightness, contrast, and resolution. Consequently it is important to select a glass material and surface treatment with care and to minimize the number of layers and interface surfaces through which the images and illuminating light must pass. Obvious variations of this overall structure are possible using optically transparent materials other than glass such as various plastics, or even opaque materials for the back plate in applications where reverse illumination is not needed.

Placing and holding individual display devices in accurate alignment prior to clamping the glass plates together has been difficult to achieve due to extremely precise requirements on alignment accuracy and the possibility of shifting one or more devices previously aligned as others are added prior to clamping all of these in place.

It is also necessary to provide a seal to prevent dust, moisture, or other contaminates from entering the display panel after assembly. Including a seal during clamping adds complexity and difficulty to the clamping process.

Various methods which are the subject of other patents have been developed for making electrical connection to each of the display elements, or for providing electrical interconnection between these. Connections can be made by overlapping edges of display elements as shown in U.S. Pat. Nos. 5,164,853 and 4,408,836 and Japanese Patent JA 0302222 or by abutting corresponding conductive pads on edge surfaces of adjacent display elements as shown in U.S. Pat. No. 5,067,021. The four patents immediately above are incorporated herein by reference. Any of the above or other connection schemes can be employed in the present invention.

OBJECTS AND SUMMARY OF THE INVENTION

It is, therefore, a principle object of the present invention to provide a display panel comprising a plurality of display devices accurately aligned to each other and sandwiched between light-transmitting plates, preferably of glass.

It is another object to provide such a display panel which can be manufactured in a relatively inexpensive manner.

It is yet another object to provide a method of making such a display panel of display devices located between plates which is readily adapted to reduced cost of production.

These and other objectives can be achieved, by providing a display panel comprising a first light-transmitting plate including first and second surfaces. A plurality of display devices having first and second surfaces are located with the first surfaces facing the first surface of the first light transmitting plate. A layer of bonding material is located between and in contact with the first-light transmitting plate and the display devices to hold the display devices in position on the first light-transmitting plate. Surprisingly, it has been determined that an optically transparent adhesive material can be used in this position without causing undue degradation of display panel performance. A second light-transmitting plate including first and second surfaces is positioned with the first surface facing the second surface of the display devices. A second layer of bonding material is located between and in contact with the second light-transmitting plate and the second surface of the display devices. This bonding material may also be optically transparent. Such a structure as just described may be, with proper design, sealed, thereby preventing contaminates of dust, moisture, or others from entering the display panel after its assembly and interfering with its operation.

A method is provided for making a display panel which comprises the steps of providing a first light-transmitting plate including a first surface, placing a first layer of bonding material on the first surface of the first light-transmitting plate, locating a plurality of display devices each including first and second surfaces with first surfaces in contact with the first layer of bonding material, curing the bonding material to hold the display devices in position, placing a second layer of bonding material in contact with the second surfaces of the display devices, providing a second light-transmitting plate having a first surface, placing the first surface in contact with the second layer of bonding material, and curing the second layer of bonding material.

DETAILED DESCRIPTION OF THE PREFERRED EMBODIMENTS

For a better understanding of the present invention, together with other and further objects, advantages, and capabilities thereof, reference is made to the following disclosure and the appended claims in connection with the drawings described above.

Figure 1:
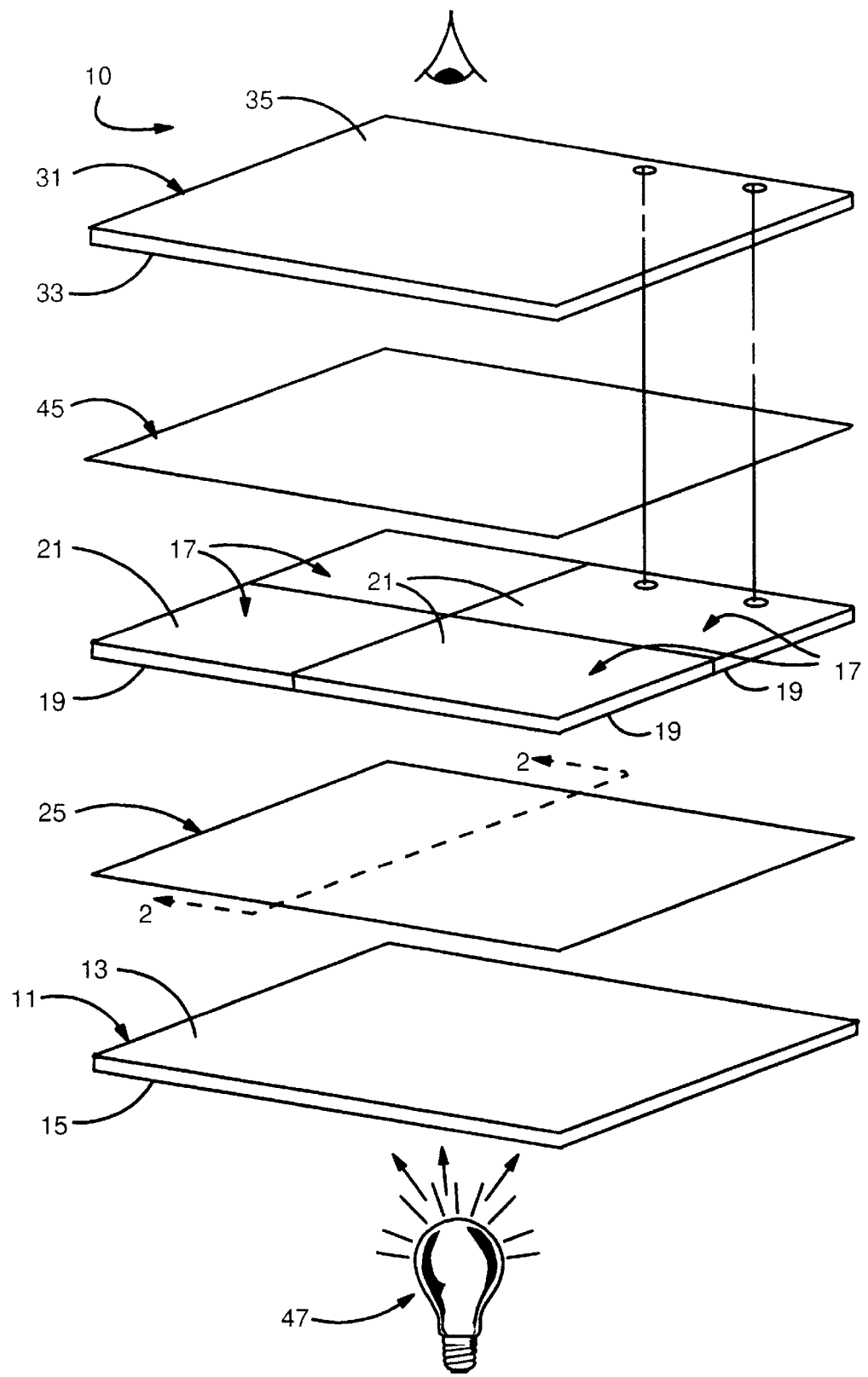
FIG. 1 illustrates the arrangement of the various parts making up a display panel in accordance with one embodiment of the invention.

In FIG. 1, a display panel 10 is shown in accordance with one embodiment of the invention. Display panel 10 includes a first light-transmitting plate 11 having first and second opposing substantially planar surfaces 13 and 15 respectively. As indicated, first light-transmitting plate 11 is preferably of glass. One example of a light-transmitting glass plate found to be acceptable is made of display grade unannealed glass material type 1737F manufactured by Corning, Inc. Other light-transmitting materials are acceptable including various plastics. A plurality of display devices 17, all of substantially uniform thickness having first and second surfaces 19, 21 respectively, are bonded to the first light-transmitting plate 11 using a first layer of bonding material 25. One type of display device used is a liquid crystal display (LCD) device of rectangular shape although other types and shapes may be used provided those used in a particular panel are all of substantially the same thickness such as the modules defined in U.S. Pat. No. 5,067,021 column 7, line 12. Examples of bonding materials, which have been found to be acceptable are acrylic adhesives such as Luxtrak 000/1.52 UV manufactured by Ablestik Electronic Material & Adhesives Company and VLC 701 manufactured by Glowtrax Inc. Other bonding materials known in the art may also be used, e.g, ultraviolet (U.V.) curable silicones that are optically clear. In some embodiments of this invention the illuminating light and the display device image must pass through one or more layers of bonding material. It has been discovered that an optically transparent adhesive such as one of these listed above will provide acceptable display panel performance figures for brightness, contrast, and resolution even though a layer of bonding material adds an additional two optical interface surfaces and one additional layer of optical absorption.

In one embodiment, the bonding material 25, in sheetlike form is first placed in contact with the first surface 13 of the first light-transmitting plate 11 and then the display devices 17 are each accurately located one at a time in predefined positions with the first surfaces 19 thereof in contact with the first layer of bonding material 25. In this embodiment, the individual display devices 17 are held in position while the bonding material is cured either partially or completely in part or all of the area between the display devices 17 and the first light-transmitting plate 11. This curing causes the bond between the devices and plate to be of sufficient strength to prevent relative movement therebetween after the holding force is removed. Curing can be accomplished with heat, ultraviolet (U.V.) radiation, or visible light. Several seconds of U.V. radiation exposure or several minutes of visible light exposure cures the acrylic adhesives listed above at room temperature (about 25° C.). Very small U.V. sources can be used so that the adhesive material is cured in just a small area or spot, by pulsing a small U.V. source. This allows the display devices to be fixed in place with a series of spot-cured adhesive areas using a process analogous to spot-welding. After all of the display devices 17 are attached in position, a second light-transmitting plate 31 including first 33 and second 35 surfaces is bonded to the second surfaces 21 of the display devices 17 by inserting a second layer of bonding material 45, also in sheetlike form, between the display devices and the first surface 33 of a second light-transmitting plate 31. Of necessity, the display devices 17 are of substantially uniform thickness so to facilitate bonding to both first and second light-transmitting plates 11 and 31. Second light-transmitting plate 31 is preferably of similar material (e.g., glass) and size to plate 11. A light source 47, if needed to actuate the invention, may be positioned adjacent the second surface 15 of first-light transmitting plate 11 as shown in FIG. 1.

Although display devices of substantially uniform thickness may be of any practical size and thickness, typical LCD display devices of 0.10 inch thickness and 4.75 inch×6.00 inch (width×length) have been used in one embodiment of this invention. First and second light transmitting plates of glass material of 0.044 inch thickness and 8.75 inch×11.50 inch (width×length) have been used. Bonding material layers are typically 0.002 to 0.010 inch thick making the overall display panel thickness about 0.19 inch thick (excluding the light source, described below).

Figure 2:
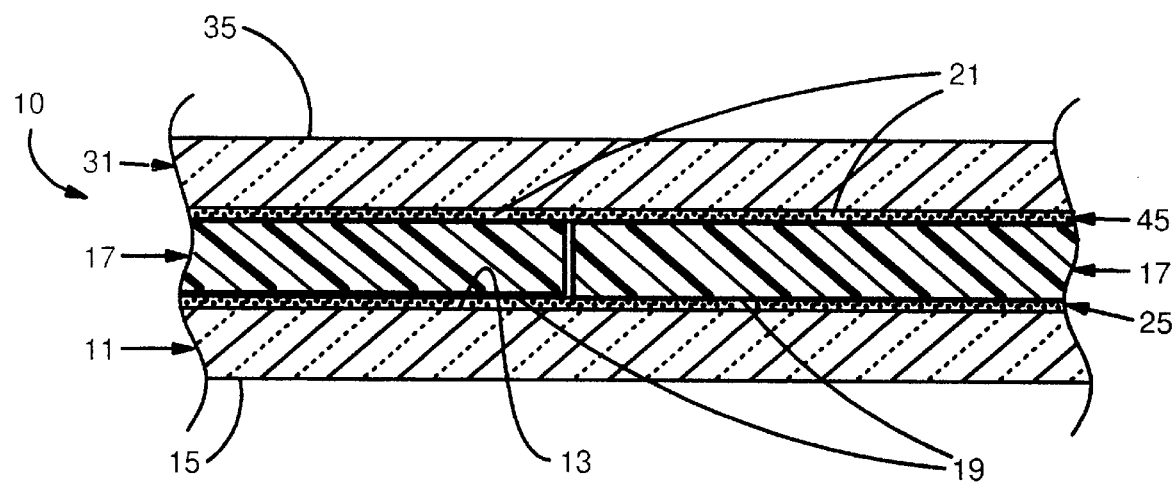
FIG. 2 is a partial cross-sectional view, taken along line 2—2 in FIG. 1, of a display panel assembled from the various parts of FIG. 1.

In FIG. 2, a portion of an assembled display panel 10 cross-section is shown. Although bonding materials 25, 45 are shown completely covering the first and second surfaces 19, 21 of display devices 17, other embodiments of the present invention may have bonding material only on certain portions of the surfaces 19, 21, an example of which is provided below.

Figure 3:
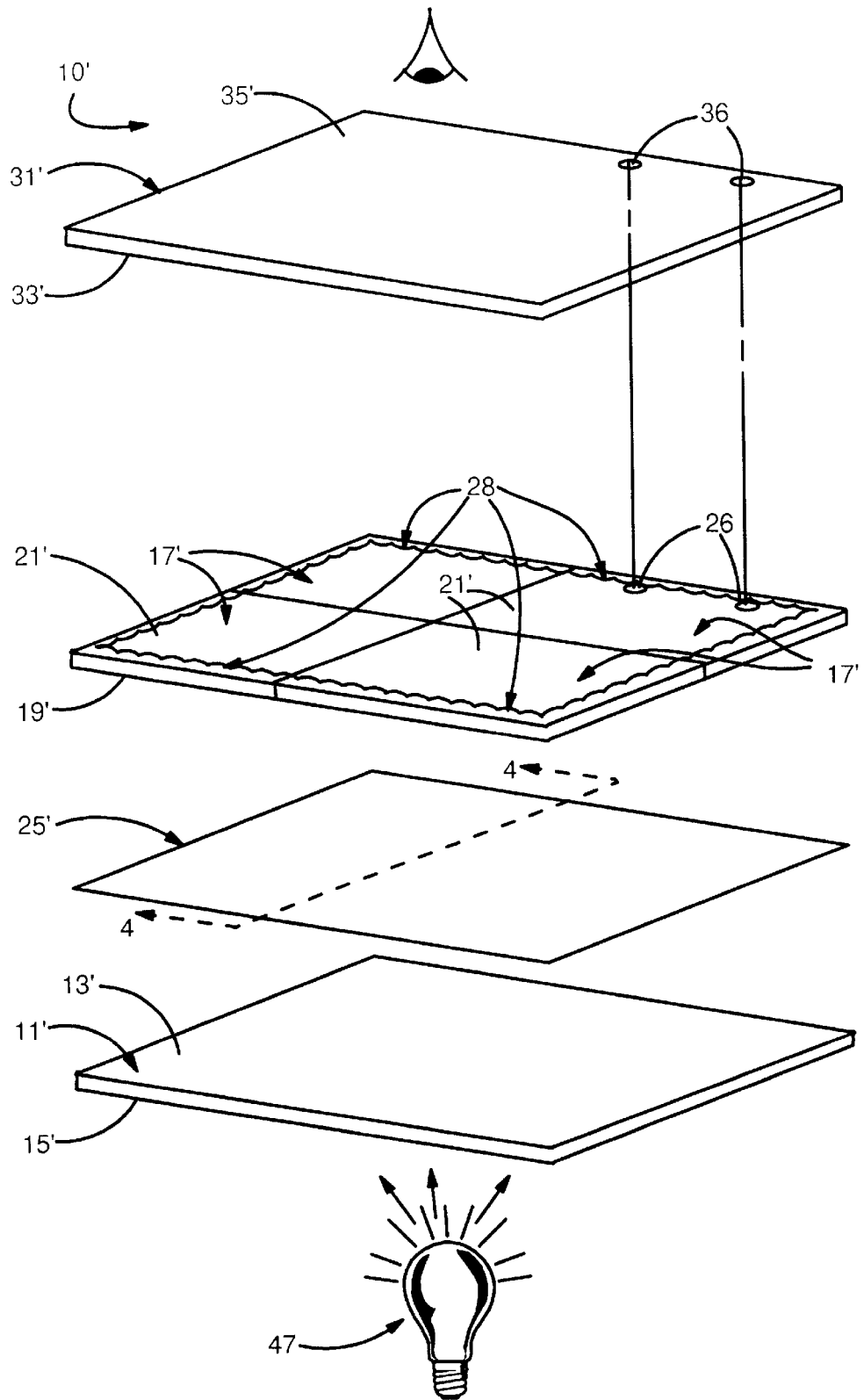
FIG. 3 illustrates the arrangement of the various parts of an alternative embodiment of the invention.

In FIG. 3, another embodiment of a display panel 10' is shown. Panel 10' includes a first light-transmitting plate 11' having first and second opposing substantially planar surfaces 13' and 15' respectively. First light-transmitting plate 11' is preferably of similar material and size as plate 11 in FIG. 1. Display devices 17, all of substantially uniform thickness having first and second surfaces 19' and 21' respectively, are bonded to the first surface 13' of the first light-transmitting plate 11' using a first layer of bonding material 25'. Similar devices and bonding material used in FIG. 1 are acceptable here as well.

The second surfaces 21' of display devices 17' are also bonded to the first surfaces 33' of second light-transmitting plate 31' with a second layer of bonding material 28. However, in this embodiment, the bonding material is located along the outer edges of display devices 17' and may thus comprise an opaque material such as an acrylic, epoxy, silicone, or urethane adhesive. Examples of acceptable opaque bonding materials are silicone adhesive type 705TC available from Master Bond, Inc. and RTV133 silicone adhesive, which is available from the General Electric Company, both of which can be applied through a syringe. Prior to curing bonding materials 28 or 25', display devices 17' are accurately positioned relative to a second light-transmitting plate 31' (similar in size and material as plate 31 in FIG. 1) using corresponding alignment marks 26 and 36 located on the second surface 21 of one of the display devices 17 (as shown) and first surface 33' of second light-transmitting plate 31', respectively.

A light source 47 may be positioned below first light transmitting plate 11 for actuating the invention.

Figure 4:
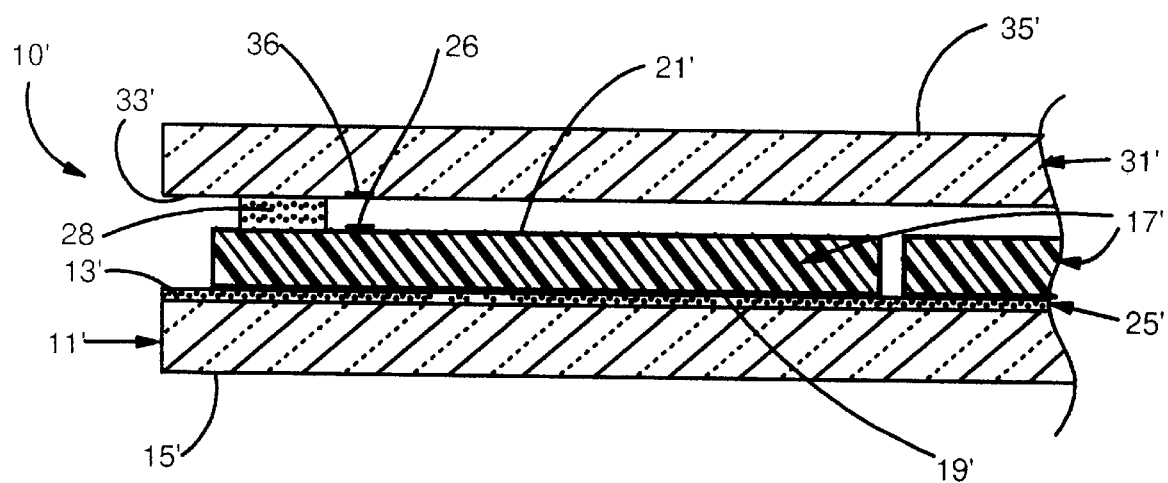
FIG. 4 is a partial cross-sectional view taken along line 4—4 in FIG. 3 of a display panel embodiment assembled from the parts shown in FIG. 3.

In FIG. 4, a portion of an assembled display panel 10' cross-section is shown. Light transmitting plates 11' and 31' extend beyond and therefore each has a greater area than the combined area of display devices 17'. Second bonding material 28 only partially covers the second surface 21' of the adjacent display device 17'. In particular just the outer edges of second surface 21' which are beyond the functional display area of display device 17' are covered with second bonding material 28. In the device examples having the dimensions provided before, the two other edges of each device were covered a width of only about 0.1 inch. Alignment marks 26 and 36 are shown in corresponding positions on second surface 21' of display devices 17' and first surface 33' of second light-transmitting plate 31'. Although first layer of bonding material 25' is shown completely filling the space between first surface 13' of first light-transmitting plate 11' and first surface 19' of display devices 17', this material could also be shown positioned similar to second layer of bonding material 28, thus only partially filling the space. In this case, first layer of bonding material 25' would be of substantially the same size and thickness as second bonding material 28, and could also be an opaque material similar to second bonding material 28. Such variations are envisioned and included in the present invention.

While there have been shown and described what are at present considered the preferred embodiments of the invention, it will be obvious to those skilled in the art that various changes and modifications may be made therein without departing from the scope of the invention as defined by the appended claims.

What is claimed is:

1. A display panel comprising:
    a first light-transmitting plate having first and second surfaces;
    a plurality of display devices of substantially uniform thickness and having a combined area less than the area of said first light-transmitting plate, each display device having first and second surfaces, said first surfaces of said display devices facing said first surface of said first light transmitting plate;
    a first layer of bonding material in contact with said first surface of said first light-transmitting plate and said first surfaces of said display devices to hold said display devices in position relative to each other on said first light-transmitting plate;
    a second light-transmitting plate having an area greater than said combined area of said plurality of display devices, and having first and second surfaces, said first surface facing said second surfaces of said display devices; and
    a second layer of bonding material located between and in contact with said first surface of said second light-transmitting plate and said second surfaces of said display devices to hold said second light-transmitting plate in contact with said display devices.

2. The display panel of claim 1 in which said first light-transmitting plate is comprised of glass.

3. The display panel of claim 2 in which said glass is a display grade unannealed material.

4. The display panel of claim 2 in which said second light-transmitting plate is comprised of glass.

5. The display panel of claim 4 in which said glass is a display grade unannealed material.

6. The display panel of claim 1 in which selected ones of said display devices comprise liquid crystal display devices.

7. The display panel of claim 1 in which said first layer of bonding material is optically transparent.

8. The display panel of claim 7 in which said first layer of bonding material comprises an adhesive sheet.

9. The display panel of claim 8 in which said first layer of bonding material is U.V. curable.

10. The display panel of claim 8 in which said first layer of bonding material is heat curable.

11. The display panel of claim 7 in which said second layer of bonding material is optically transparent.

12. The display panel of claim 11 in which said second layer of bonding material comprises an adhesive sheet.

13. The display panel of claim 12 in which said second layer of bonding material is U.V. curable.

14. The display panel of claim 12 in which said second layer of bonding material is heat curable.

15. The display panel of claim 1 in which said second layer of bonding material is located substantially only along at least one outer edge portion of each of said display devices.

16. The display panel of claim 1 in which said second layer of bonding material comprises an adhesive.

17. The display panel of claim 16 in which said second layer of bonding material is U.V. curable.

18. The display panel of claim 16 in which said second layer of bonding material is heat curable.

19. The display panel of claim 1 in which said display devices are positioned on said first light-transmitting plate in a continuous abutting pattern.

20. The display panel of claim 1 in which the ratio of said substantially uniform thickness of said display devices to the thickness of said first light-transmitting plate is within the ratio of about 2:1.

21. The display panel of claim 1 further including a light source positioned adjacent said second surface of said first light-transmitting plate for projecting light onto said first light-transmitting plate, said light passing through said first light-transmitting plate and said first layer of bonding material to illuminate said display devices.

22. The display panel of claim 1, further comprising a seal material positioned about the periphery and between said first and second light transmitting plates to prevent dust, moisture, or other contaminates from entering said display panel after assembly.

23. A method of making a display panel comprising the steps of:
    a. providing a first light transmitting plate having a first surface;
    b. placing a first layer of bonding material on said first surface of said first light-transmitting plate;
    c. locating a plurality of display devices having a combined area less than the area of said first light transmitting plate, each display device having first and second surfaces on said first layer of bonding material with said first surfaces of said display devices in contact with said first layer of bonding material;
    d. curing said first layer of bonding material to hold said display devices in position on said first layer of bonding material relative to said first light-transmitting plate;
    e. placing a second layer of bonding material in contact with said second surfaces of said display devices;

f. providing a second light-transmitting plate having an area greater than said combined area of said plurality of display devices, and having a first surface;

g. placing said first surface of said second light-transmitting plate in contact with said second layer of bonding material; and h. curing said second layer of bonding material.

24. The method of claim 23 in which said locating of said plurality of display devices comprises the steps of providing alignment means on said display devices and said first light-transmitting plate and then aligning said devices and said light-transmitting plate through said first layer of bonding material.

25. The method of claim 23 in which said curing of said first layer of bonding material is accomplished using ultraviolet radiation.

26. The method of claim 23 in which said curing of said first layer of bonding material is accomplished using heat.

27. The method of claim 25 in which said curing of said second layer of bonding material is accomplished using ultraviolet radiation.

28. The method of claim 26 in which said curing of said second layer of bonding material is accomplished using heat.

* * * * *